United States Patent [19]

McCullough

[11] 4,372,927
[45] Feb. 8, 1983

[54] SULFUR OXIDES REMOVAL

[75] Inventor: Glenn R. McCullough, Houston, Tex.

[73] Assignee: Shell Oil Company, Houston, Tex.

[21] Appl. No.: 293,893

[22] Filed: Aug. 17, 1981

[51] Int. Cl.$^3$ .............................. B01J 8/00; C01B 7/00; C01F 1/00
[52] U.S. Cl. ...................................... 423/244; 423/166
[58] Field of Search .......... 423/242 A, 242 R, 244 A, 423/244 R, 166

[56] References Cited

U.S. PATENT DOCUMENTS 3,920,794  11/1975  La Mauba et al. ................. 423/242
3,981,972  9/1976  Hishinuma et al. ................. 423/244

FOREIGN PATENT DOCUMENTS 2342861  4/1974  Fed. Rep. of Germany ...... 423/242
 917501  2/1963  United Kingdom ................ 423/242

Primary Examiner—Earl C. Thomas
Assistant Examiner—Gregory A. Heiler
Attorney, Agent, or Firm—Albert J. Adamcik

[57] ABSTRACT

A process for the removal of $SO_X$ from a gaseous stream is disclosed in which the gaseous stream is contacted (a) with a particulate mixture of a reactive calcium-containing material and activated carbon, or (b) particulate activated carbon, the particulate activated carbon subsequently being mixed with a reactive calcium-containing material.

19 Claims, No Drawings

SULFUR OXIDES REMOVAL

BACKGROUND OF THE INVENTION

To meet pollution control requirements, a number of processes have been proposed and utilized for the desulfurization of stack gases. In particular, wet-lime or wet-limestone vapor scrubbing systems are commonly used for removing sulfur oxides ($SO_x$) from effluents. These processes have many undesirable features, such as high cost and disposal problems. The invention seeks to overcome these deficiencies.

SUMMARY OF THE INVENTION

Accordingly, the invention, in one embodiment, relates to a process for the removal of sulfur oxides from gaseous streams containing the sulfur oxides in which the stream is contacted with a mixture containing a reactive calcium-containing material and activated carbon. More particularly, the invention comprises a process in which the sulfur oxides ($SO_2$ and $SO_3$) are removed from gas streams by contacting the gas stream with a particulate mixture of a reactive calcium-containing material and activated carbon, the calcium-containing material and the activated carbon being present in a ratio of 100:1 to 0.1:1 calcium-containing material to activated carbon by weight. The contacting is carried out under conditions to produce $CaSO_4$, as set out more fully herein.

In a second embodiment of the invention, the gas stream containing the sulfur oxides is first contacted with particulate activated carbon in a contact zone under conditions to adsorb the sulfur oxides on the carbon and produce a purified gas stream and a "loaded" activated carbon containing sulfur oxides and $H_2SO_4$, and the loaded activated carbon is then contacted intimately with a calcium-containing material under conditions to produce $CaSO_4$.

The particular type of gaseous stream or effluent treated is largely a matter of choice, as will be evident to those skilled in the art. Streams suitably treated by the process of the invention include gaseous effluents, such as effluents or flue gases derived from the combustion of coal, lignite, oil, natural gas and mixtures thereof, Claus effluents, and similar gases. In general, the type of stream from which the sulfur oxides are removed is not critical, those skilled in the art recognizing, of course, that streams having major components reactive with activated carbon or calcium-containing materials would not be usefully treated.

Similarly, the choice of calcium-containing materials is widely variable, the obvious exception being, of course, $CaSO_4$. $CaCl_3$ may be used. As used herein, the term "reactive calcium-containing material" is understood to include any calcium-containing material which will provide calcium to react with $SO_2$, $SO_3$, or $H_2SO_4$, available as provided herein. In general, CaO, $CaCO_3$, and mixtures thereof, are preferred. The materials need not be pure, and a wide variety of materials may be used. Limestones, (principally $CaCO_3$), because of their low cost and wide availability, are a preferred source of reactive calcium-containing material. However, such unusual sources as limes, oyster shells, etc., if reduced to appropriate size, may be employed. Whatever the case, the reactive calcium-containing material will be supplied in an amount sufficient to remove the bulk of the sulfur oxides in the gas, preferably at least a stoichiometric amount, as fully described hereinafter.

The type of activated carbon employed does not appear critical, although it is recognized that some activated carbons give better results than others. In general, the activated carbons chosen are critical only in the sense that, for good results, the carbons should exhibit a high rate of $SO_2$ and/or $SO_3$ adsorption but should readily transfer $H_2SO_4$. Although not to be taken as delimiting the invention, it is believed that the activated carbon adsorbs the $SO_2$ and $SO_3$ where they are converted, respectively, in the presence of oxygen, and water vapor, to $SO_3$ and $H_2SO_4$, the $SO_3$ formed, in turn, reacting to $H_2SO_4$, and the $H_2SO_4$ produced then reacting with the calcium-containing material to form calcium sulfate. Accordingly, those skilled in the art may select suitable $SO_2/SO_3$ adsorptive activated carbons from sources such as the standard gas and vapor adsorbent carbons described in "Encyclopedia of Chemical Technology" by Kirk-Othmer, second edition, second printing (March 1967), Volume 4, pages 149 to 158, which disclosure is incorporated herein by reference. Again, in the case of the first embodiment, the composite may be supplied by mixing hydrocarbonaceous residue or tar as a binder with the calcium-containing material (e.g., limestone pellets) and firing the mixture to produce the activated carbon.

The particle size of the reactive calcium-containing material is not critical, and this is also true of the activated carbon particles. In general, the reactive calcium-containing material particle sizes will range from $10^{-3}$ in. to 1.0 in., preferably from 0.005 in. to 0.1 in., and similar particle size ranges will obtain for the activated carbon. If it is desired to recycle or recover the activated carbon, it is advantageous that, within the ranges indicated, the carbon and calcium-containing material be of different sizes to aid in separation.

As indicated, the calcium-containing material and the activated carbon will be present or mixed in a ratio of from 100:1 to 0.1:1, preferably 20:1 to 2:1 by weight. Temperatures employed during the contacting are not critical, the only requirement being that the temperature be sufficiently low that adsorption on the activated carbon can occur. Obviously, since the desired product is $CaSO_4$, the temperature of dissociation of $CaSO_4$ should not be exceeded. Again, temperatures must not be so severe as to prevent the series of reactions, mentioned, supra, from occurring. In general, temperatures of from 60° F. to 900° F., preferably from 200° F. to 500° F., may be employed.

Similarly, since the reaction is believed to be at least partly in the vapor phase, excessive pressures should be avoided. Normally, pressures should range from 0.5 atmospheres to 10 atmospheres, with pressure of 1 atmosphere to 2 atmospheres preferred.

In general, the gaseous streams or effluents within the contemplation of the invention contain sufficient oxygen and/or water vapor so that addition of one or both of these components is not necessary. However, if the calcium-containing material lacks oxygen, or if the gas stream treated has insufficient oxygen, it may be necessary to add oxygen to the gas stream treated. As used herein, the term "oxygen" includes oxygen-containing gases, such as air or air enriched with oxygen. Those skilled in the art may make such adjustments, as needed. Again, the addition of water vapor may be necessary if none is present in the stream being treated. Normally, the amount of water should not exceed 50 percent, preferably 20 percent, by weight. Those skilled in the art may also adjust the water concentration to give optimum results.

The process of the invention may be carried out in a number of ways. For example, in the first embodiment, the $SO_2$-containing gas may be passed upwardly or downwardly through a downwardly moving bed or beds of the mixture of the invention, provision being made for periodic or continuous removal of reacted mixture at the bottom of the bed or beds and similar replenishment of the charge at the top of the bed or beds. If desired, the activated carbon may be separated from the spent material and returned after blending with fresh reactive calcium-containing material to the top of the bed(s) for reuse. Static beds, e.g., in parallel, with provision for switching the $SO_x$-containing stream from bed to bed, on a predetermined utilization of a given bed's charge, may be used. Preferably, however, some manner of mixing or agitation of the particulate mixture should be provided to assist transfer of $H_2SO_4$ to the calcium-containing material. Similar equipment may be used in the second embodiment of the invention, good mixing of the loaded activated carbon and the reactive calcium-containing material being required in this case. The process is preferably carried out continuously.

In order to demonstrate the transfer of $H_2SO_4$ from an activated carbon to a calcium-containing material, the following experiments were conducted.

EXAMPLE I

Sulfuric acid (63% concentration) was impregnated on 20–40 mesh activated charcoal. The $H_2SO_4$-containing charcoal (10 g) was then mixed with powdered limestone (20 g) to make several samples. The mixtures were then shaken for 5–60 minutes and then separated by sieving. The $H_2SO_4$ remaining on the charcoal was determined by titrating with standard NaOH solution. (The titration was carried out with the charcoal immersed in water and the end-point [pH 7] was determined with pH paper.)

The experiment showed that $H_2SO_4$ did in fact transfer to the limestone. The extent of transfer was the same for agitation times of the samples varying from 5 to 60 minutes.

EXAMPLE II

Additional $H_2SO_4$ transfer experiments were done with two different activated carbons. The properties of the carbons are summarized, as follows:

|  | Curtain (33657) | Pittsburgh BPL |
|---|---|---|
| S.A., $M^2$/g | — | 1100 |
| Pore Volume, cc/g | 0.4 | 0.7 |
| Bulk Density, g/cc | — | 0.5 |

The experiments were carried out at room temperature and 15 minutes contact time. The results of the experiments are shown, as follows:

| Initial $H_2SO_4$ ml/10g Carbon | $H_2SO_4$ Transferred, Curtin (33657) | ml/10g Charcoal Pittsburgh BPL |
|---|---|---|
| 1 | 0.2 | 0.2 |
| 2 | 0.5 | 0.9 |
| 3 | 1.1 | — |
| 4 | 2.1 | 2.6 |

It appears that an amount of about 1–2 ml of $H_2SO_4$ on the charcoal is strongly adsorbed and transfers to the limestone only partially; additional $H_2SO_4$ is transferred quantitatively to the limestone.

In summary, the results of these $H_2SO_4$-transfer experiments indicated that for the bulk of the adsorbed $H_2SO_4$, transfer to limestone is fast, and for contact times longer than five minutes temperature independent. With the two carbons examined, a portion of the $H_2SO_4$ is strongly adsorbed and transfers only slowly.

EXAMPLE III

In order to demonstrate the removal of $SO_2$ by actual adsorption and recovery from a gas stream, the following experiment was conducted. A simulated stack gas containing 2000 PPM $SO_2$ (82.8 percent $N_2$, 9.6 percent $CO_2$, 2.4 percent CO, 5.0 percent water) was passed through an adsorption tube containing the Pittsburgh BPL carbon described above. Temperature of the bed was 300° F., and total residence time of the gas in the tube was 2.5 seconds. Initial removal of $SO_2$ was about 92 percent, and over a period of 13 hours $SO_2$ removal declined to 50 percent. At this time, the $SO_2$-adsorption experiment was interrupted and the carbon removed from the adsorption tube. The 20–40 mesh carbon was then contacted with 5 g of dry, powdered limestone for 30 minutes at 300° F. After separation from the limestone, the carbon was packed again in the adsorption tube and the $SO_2$-adsorption experiment continued. Adsorption increased to 62% (an increase which corresponds to four hours of adsorption processing time) and subsequently continued a decline parallel to that observed initially. From the weight increase of the carbon during the adsorption experiment and weight loss during the $H_2SO_4$-transfer experiment, 0.74 g of $H_2SO_4$ was adsorbed and 0.23 g of $H_2SO_4$ was transferred in the two experiments. Assuming 63 percent $H_2SO_4$ concentration, these values correspond to 0.77 ml and 0.24 ml $H_2SO_4$, respectively.

These experiments demonstrate that $SO_2$ adsorbed on charcoal as sulfuric acid will transfer to dry limestone with a corresponding regeneration of the adsorptive ability of the charcoal. Furthermore, the simple transfer experiments with impregnated $H_2SO_4$ appear to serve as an adequate model of the transfer process.

What is claimed is:

1. A process for the removal of sulfur oxides from a gaseous stream containing oxygen and water vapor comprising contacting the gaseous stream in a contact zone with a particulate mixture of a reactive calcium-containing material and activated carbon, the ratio of reactive calcium-containing material to activated carbon, on a weight basis, being from 100:1 to 0.1:1.

2. The process of claim 1 wherein particulate mixture containing calcium sulfate and activated carbon is removed from the contact zone.

3. The process of claim 2 wherein the ratio, on a weight basis, of reactive calcium-containing material to activated carbon is from 20:1 to 2:1.

4. The process of claim 3 wherein the reactive calcium-containing material is selected from CaO, $CaCO_3$, and mixtures thereof.

5. The process of claim 4 wherein activated carbon is separated from the particulate mixture containing calcium sulfate, and activated carbon is returned, after blending with fresh reactive calcium-containing material, to the contact zone.

6. The process of claim 1 wherein the particulate mixture containing calcium sulfate and activated carbon is continuously or periodically removed from the contact zone, and activated carbon and a reactive calcium-containing material are continuously or periodically added to the contact zone.

7. The process of claim 6 wherein the ratio, on a weight basis, of reactive calcium-containing material to activated carbon is from 20:1 to 2:1.

8. The process of claim 7 wherein the reactive calcium-containing material is selected from CaO, CaCO$_3$, and mixtures thereof.

9. The process of claim 8 wherein activated carbon is separated from the particulate mixture containing calcium sulfate, and activated carbon is returned, after blending with fresh reactive calcium-containing material, to the contact zone.

10. A process for the removal of sulfur oxides from a gaseous stream containing oxygen and water vapor comprising contacting the gaseous stream in a first contact zone with a particulate mixture of a reactive calcium-containing material and activated carbon, the ratio of reactive calcium-containing material to activated carbon, on a weight basis, being from 100:1 to 0.1:1, stopping the flow of said gaseous stream to the first contact zone, and continuing the flow of and contacting said gaseous stream in a second contact zone with a particulate mixture of a reactive calcium-containing material and activated carbon, the ratio of reactive calcium-containing material to activated carbon on a weight basis, in said second contact zone, being from 100:1 to 0.1:1.

11. The process of claim 10 wherein particulate mixture containing calcium sulfate and activated carbon is removed from a contact zone.

12. The process of claim 11 wherein the ratio, on a weight basis, of reactive calcium-containing material to activated carbon in the first contact zone is from 20:1 to 2:1.

13. The process of claim 12 wherein the ratio, on a weight basis, of reactive calcium-containing material to activated carbon in the second contact zone is from 20:1 to 2:1.

14. The process of claim 13 wherein the reactive calcium-containing material is selected from CaO, CaCO$_3$, and mixtures thereof.

15. The process of claim 14 wherein activated carbon is separated from the particulate mixture from a contact zone, and activated carbon is returned, after blending with fresh reactive calcium-containing material, to a contact zone.

16. A process for the removal of sulfur oxides from a gaseous stream containing oxygen and water vapor comprising contacting the gaseous stream in a contact zone with particulate activated carbon, and producing loaded particulate activated carbon having adsorbed materials selected from SO$_2$, SO$_3$, H$_2$SO$_4$, and mixtures thereof, removing loaded particulate activated carbon from the contacting zone, and mixing loaded particulate activated carbon with particulate reactive calcium-containing material under conditions to produce a particulate mixture containing calcium sulfate and activated carbon, the ratio of reactive calcium-containing material to activated carbon, on a weight basis, being from 100:1 to 0.1:1.

17. The process of claim 16 wherein the ratio, on a weight basis, of reactive calcium-containing material to activated carbon is from 20:1 to 2:1.

18. The process of claim 17 wherein the reactive calcium-containing material is selected from CaO, CaCO$_3$, and mixtures thereof.

19. The process of claim 18 wherein the reactive calcium-containing material and the activated carbon are separated, and the activated carbon is returned to the contact zone.

* * * * *